Figure 1:
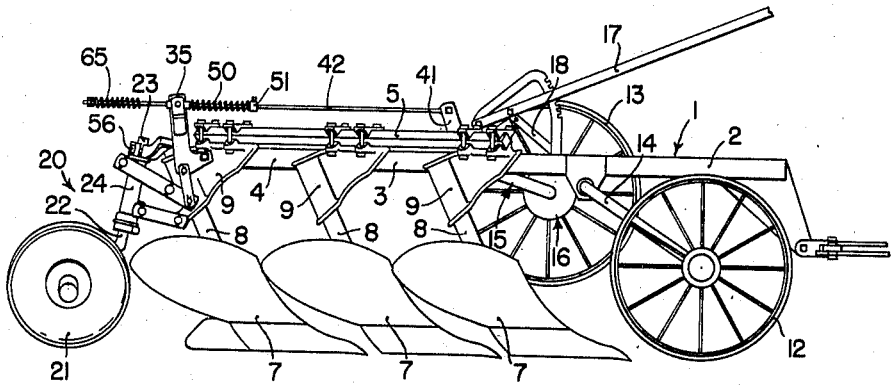

Feb. 1, 1944.   C. G. STRANDLUND   2,340,495
PLOW
Filed June 9, 1941

INVENTOR
CARL G. STRANDLUND
BY
ATTORNEYS

Patented Feb. 1, 1944

2,340,495

UNITED STATES PATENT OFFICE 2,340,495

PLOW

Carl G. Strandlund, Moline, Ill., assignor to Deere & Company, Moline, Ill., a corporation of Illinois Application June 9, 1941, Serial No. 397,183

9 Claims. (Cl. 97—127)

The present invention relates generally to agricultural implements and is particularly concerned with the provision of a new and improved rear end construction for plows and the like.

In plows of the three wheel type, generally constructed with front furrow and land wheels and a rear furrow wheel, the latter wheel usually has two functions. First, when the plow bottoms are lowered into operating position, the rear furrow wheel runs along the bottom of the furrow against the furrow wall and is so connected as to sustain laterally directed thrusts. Second, the rear furrow wheel is swingably mounted so that by moving the wheel downwardly, relative to the plow frame, the latter may be elevated into its transport position, and when the rear furrow wheel, together with the front land and furrow wheels, are in their lowered positions raising the frame into its transport position, it is desirable to have the rear furrow wheel arranged to caster in order to provide for easy maneuverability of the plow. Therefore, the rear furrow wheel is usually arranged for generally vertical swinging movement and is so constructed and arranged that the rear furrow wheel is allowed to caster, or swing laterally, when the plow frame is raised but is locked against castering when the frame is lowered into operating position so as to sustain the laterally directed thrusts mentioned above.

In certain soil conditions there are occasions when the frame and plow bottoms are bodily lifted momentarily out of the ground, and when that occurs, if the rear wheel is free to fall away from its locked position, it may not move back into its normal operating position, locked against castering, until the plow moves some distance beyond the obstruction.

The object and general nature of the present invention is the provision of means for holding the rear wheel in its locked position, held against castering, even though the frame and plow bottoms should be lifted out of their normal operating position. Specifically, it is a feature of this invention to provide means for holding the rear furrow wheel in its raised position, relative to the frame, thus not only holding the wheel locked against castering but also loading a substantial portion of the weight of the wheel and associated parts onto the rear end of the frame, thereby increasing the resistance of the plow against being forced out of proper operating position and preventing undue wear of the rear end parts. More particularly, it is a feature of this invention to provide spring means reacting through the lifting connections against the frame of the plow and through the swingable means connecting the rear wheel with the plow for holding the rear furrow wheel latched to the frame and for holding the wheel in its upward position, relative to the frame, so as to prevent the rear furrow wheel from becoming unlocked and swinging out of the proper position. Thus, when soil conditions are encountered that result in raising the rear end of the plow, the furrow wheel does not drop down out of latched position, but is held in its upper position at all times, so that when the plow resumes normal operation, the rear furrow wheel is immediately available to sustain the laterally directed thrusts by engaging the furrow wall.

These and other objects and advantages of the present invention will be apparent to those skilled in the art after a consideration of the following detailed description, taken in conjunction with the accompanying drawing illustrating the preferred form of this invention.

Figure 2:
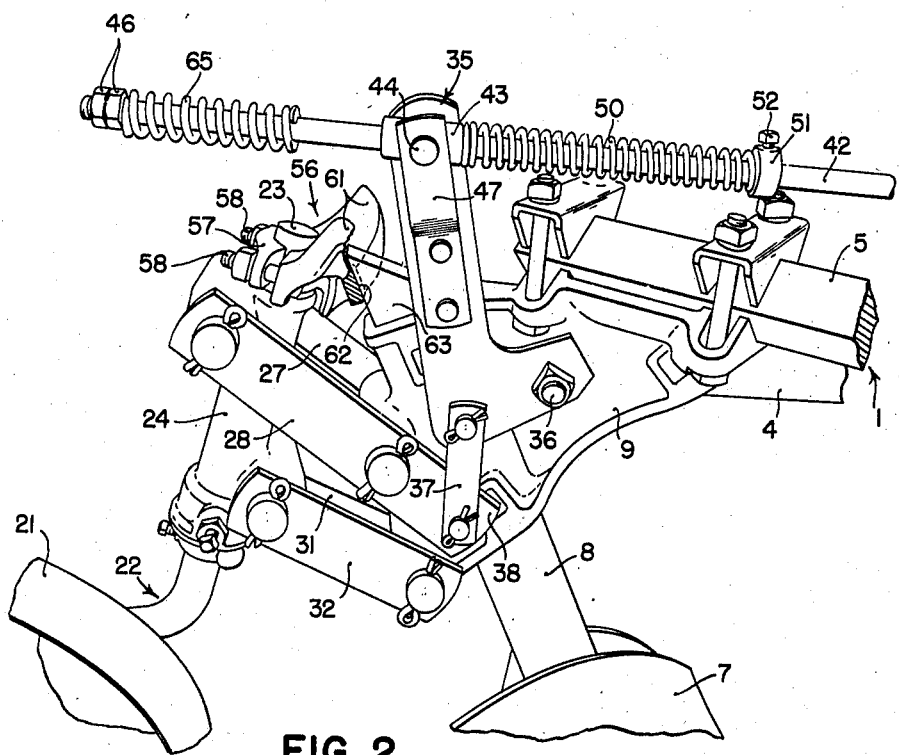

In the drawing:

Figure 1 is a side view of a three bottom plow in which the principles of the present invention have been incorporated; and Figure 2 is an enlarged fragmentary perspective view of the rear end of the plow showing the spring means by which the rear furrow wheel is held in its raised position at all times except when the plow frame and plow bottoms are raised into their transport position by the normal raising means.

Referring now more particularly to Figure 1, the frame of the plow is indicated in its entirety by the reference numeral 1 and comprises a plurality of plow beams 2, 3 and 4, suitably connected together by cross bars and the like and by a rear diagonal bar 5. The plow bottoms are indicated by the reference numeral 7, and each is fixed to the lower end of a standard 8 which at their upper ends are connected by suitable brackets 9 to the respective plow beams, the connections being such as to accommodate the diagonal bracing bar 5. The front end of the plow is supported by a front furrow wheel 12 and a front land wheel 13 connected, respectively, by crank axles 14 and 15 with the plow frame 1. The crank axles 14 and 15 are suitably connected together and the crank axle 15 is provided with power lift construction mechanism, indicated in its entirety by the reference numeral 16 and including a depth adjusting lever 17 against which the clutch mechanism 16 acts through a link 18, as in conventional tractors. A plow of this general type is shown in my prior Patent No.

2,179,528, issued November 14, 1939, to which reference may be had if necessary.

The rear wheel construction of the plow is indicated in its entirety by the reference numeral 20 and includes a rear furrow wheel 21 mounted for rotation on the laterally outwardly and rearwardly directed portion of a crank axle 22, the latter including a spindle section 23 disposed generally vertically and mounted for lateral swinging movement in a sleeve 24. The latter is connected by an upper pair of links 27 and 28 and a lower pair of links 31 and 32 to the rear beam casting 9 so as to be swingable generally in a vertical direction relative to the plow frame. The means for swinging the crank axle 22 generally vertically comprises a lever 35 mounted for pivotal movement on the rear beam casting 9 by a pivot bolt 36. The lever 35 is connected by a link 37 to a forward extension 38 formed on the link 28. As best shown in Figure 2, rearward swinging movement of the lever 35 exerts a downward thrust through the link 37 against the link 28, raising the sleeve 24 and the associated crank axle into its raised position, in which the frame 1 is lowered into its operating position. The member 35 on the plow frame is actuated at the same time that the forward crank axles 14 and 15 are actuated by the power lift 16. To this end, in arm 41 is fixed to or connected with the power lift crank axle 15 and is apertured to receive the forward end of a generally longitudinally extending link member 42, the rear end of which extends slidably through a sleeve 43 and pivotally connected by trunnions 44 with the upper end of the lever 35. The rear end of the link member 42 is threaded and receives a pair of lock nuts 46. A hammer strap 47 is secured to one side of the lever 35 to provide a support for one of the trunnions 44. A spring 50 is disposed about the rear portion of the link 42 and bears at its forward end against a set screw collar 51 adjustably secured to the link member 42 by a set screw 52. The rear end of the spring 50 bears against the forward end of the sleeve 43 that is carried at the upper end of the lever 35. A member 56 is secured to the upper end of the spindle 23 by any suitable means, such as a clamp member 57 and a pair of clamping bolts 58, and the member 56 is provided with a pair of cam sections 61 between which is formed a notch 62. The upper end of the rear standard 8 is extended, as at 63, so that when the rear wheel 21 and crank axle 22 are raised relative to the plow frame to provide for lowering of the latter into operating position, the extension 63 is disposed in the notch 62 and, since the member 56 is clamped to the spindle 23, holds the crank axle 22 against lateral swinging movement about the generally upright axis defined by the spindle section 23. Thus, the wheel 21 is held against castering when the plow bottoms 7 are in operating position.

When the operator desires to raise the plow into its transport position, the power lift clutch 16 is actuated, which causes the forward crank axles 14 and 15 to swing generally downwardly relative to the plow frame, thus raising the latter. As the crank axle 15 swings downwardly, the arm 41 on the latter swings forwardly, which exerts a pull through the link member 42 and acts through the lock nuts 46 and a transport cushioning spring 65 against the lever 35 swinging the upper end thereof forwardly. This exerts a pull through the link 37 and swings the two pairs of links 27, 28 and 31, 32 generally downwardly, thus raising the rear end of the frame upwardly relative to the furrow wheel 21. As the frame is raised the wheel 21 and crank axle 22 swing downwardly, thereby moving the cam member 66 out of engagement with the extension part 63 on the plow frame, thus freezing the wheel 21 for castering movement, which facilitates maneuvering of the plow in its transport position, as mentioned above. When the farmer desires to lower the plow into operating position, he actuates the power lift clutch 16 so as to permit the crank axles 14 and 15 to swing upwardly relative to the plow frame, and this movement causes the arm 41 to move the longitudinal link member 42 generally rearwardly, bringing the collar 51 up against the spring 50 placing the latter under compression. The spring compression, together with the weight of the rear end of the plow, causes the latter to move downwardly relative to the wheel 21 and crank axle 22. As the latter swings upwardly, the cam sections 61 on the member 56 guides the part 63 into the notch 62 so that when the plow reaches its operating position the crank axle 22 is locked against castering movement and the spring 50 is compressed sufficiently to hold the rear wheel 21 and associated parts up in the position shown in Figure 2, even though the rear end should momentarily be raised. Being thus held in locked position, as shown in Figure 2, with the extension 63, independent of the frame, the rear furrow wheel 21 sustains laterally directed thrusts, as is necessary. In this position the link member 42 moves rearwardly an amount sufficient to carry the cushioning spring 65 away from the lifting lever 35.

From the operation as so far described, it will be observed that if the plow bottoms should be forced out of the ground, as by striking a hard spot or by the soil balling up underneath the plow bottoms during operation, the rear end of the plow would be lifted, and as a result there is a tendency for the weight of the wheel and spindle to remain in its lowered or furrow bottom engaging position, with the possible result that the cam member 56 would be moved away from the upper end 63 of the standard 8, thus unlocking the rear furrow wheel 21 and permitting the same momentarily to caster. If this should occur, the laterally directed forces which would be set up as soon as the plow bottoms again enter the ground might cause the wheel 21 to shift to one side so that after the plow passes the obstruction or the soil is cleared away from underneath the bottoms, the subsequent lowering of the frame would cause the part 63 to approach the member 56 with the latter out of proper position, and the plow will move a few feet forward before the cams 61 act to restore the rear wheel to proper position where the end 63 can enter the notch 62. According to the present invention, however, no time is lost because the spring 50, being compressed between the set screw collar 51 and the lever 35, acts at its forward end through the link 42 and the arm 41 against the plow frame and, at its rear end, through the lever 35 and associated linkage against the rear furrow wheel crank axle, thereby exerting force tending continuously to hold the crank axle 22 in an upward position, with the notch 62 and the member 56 engaged with the part 63 on the plow frame. Thus, even though the plows should be forced out of the ground, raising the frame, the spring 50 exerts sufficient force to overcome the weight of the wheel 21 and associated parts and thus holds the wheel continuously locked against castering at all times that the plow is in operating position. Of course, as described above, when the lifting mechanism 16 and associated parts are actuated to lift the plow, the forward movement of the link 42 acts through the lever 35 to raise the frame relative to the furrow wheel 21, freeing the same for castering, the forward movement of the link 42 serving, in effect, to disable the crank axle holding spring 50. The tension which the latter exerts when the plow is in operating position (Figure 2) may be adjusted by moving the set screw collar 51 to various positions and securing it in the desired position on the link 42.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a plow, a supporting caster wheel mounted for vertical movement, means for raising and lowering the plow into and out of operating position, means for locking the wheel against castering when the plow is in its lowered position, said locking means being releasable when the plow is raised out of its operating position so as to facilitate making turns during transport, and means actuated by movement of the raising and lowering means into its lowered position for preventing the release of said locking means so long as said raising and lowering means is in its lowered position.

2. A rear end construction for a plow or the like having a frame, ground engaging tool means thereon and a movably mounted member adapted to raise and lower the tool means, said rear end construction comprising a crank axle having a wheel and swingably connected with the plow frame for movement in a generally vertical direction, a lever pivotally mounted on the plow frame and operatively connected with said crank axle for moving the same generally vertically, a generally longitudinally extending link operatively connected at its forward end with said member and at its rear end with said lever, whereby operation of said member acts through said link for shifting the position of said crank axle, and a spring encircling said link and connected at its forward end thereto and at its rear end to said lever, whereby said spring means acts through said link and member against said frame and through said lever against said crank axle for yieldingly holding the latter and said wheel in a raised position relative to the plow frame during operation.

3. A rear end construction for a plow or the like having a frame, comprising a crank axle having a wheel at the lower end thereof and swingably mounted on said frame for both castering and generally vertical movement relative to said frame for raising and lowering the latter, means operative when the crank axle is in its raised position for locking the wheel against castering, and means on the frame for moving said crank axle and wheel into a raised position relative to the frame for lowering the latter relative to the ground, said means including spring loaded means whereby said crank axle and wheel are prevented from falling away from their raised position when the plow is forced out of the ground.

4. In a plow the combination of a frame, a furrow wheel, means connecting the furrow wheel with the frame so that the furrow wheel may caster about an upright axis and may be moved to raised and lowered position with respect to the frame, means for automatically locking the wheel against castering when the wheel has been moved to raised position relative to the frame, and means for yieldingly holding said wheel in its raised position so as to prevent the release of said locking means when the plow is forced out of the ground.

5. In a plow, the combination of a frame, a furrow wheel, an upwardly extending spindle on which said wheel is mounted, means connecting the furrow wheel spindle with the frame so that the furrow wheel may caster about a generally upright axis and may be moved to raised and lowered position with respect to the frame, a locking member on the upper end of said furrow wheel spindle, a part on the frame and engageable with said locking member for locking the wheel against castering when the wheel has been moved to raised position relative to the frame, and means for yieldingly holding said locking member and said part in engagement so as to prevent the release of said locking means when the plow is forced out of the ground.

6. A rear end construction for a plow or the like having a frame, soil working means and a member movably mounted on the frame for raising and lowering the tool means relative to the ground, said rear end construction comprising a crank axle having a rear wheel journaled thereon, means swingably connecting the crank axle with the rear portion of the plow for generally vertical movement relative thereto for raising and lowering the plow, a part mounted on the plow and operatively connected with said crank axle for raising the latter to accommodate lowering of said tool means and for lowering the crank axle to raise said tool means, means operatively connecting said part with said member, and spring means connected at one end with said last mentioned connecting means and at the other end with said part, said spring means being biased so as to act through said last mentioned connecting means and said member against the frame of the plow and through said part and said first mentioned connecting means against the crank axle for holding the latter in a raised position relative to the plow frame for loading the weight of the crank axle and wheel onto the plow when the tool means tends to lift said frame.

7. In a plow, a supporting caster wheel mounted for movement relative to the plow, lifting means movable from one position to another for raising the plow relative to said caster wheel into and out of operating position, means responsive to the operation of said lifting means lowering the plow relative to the caster wheel into operating position for locking said wheel against castering and responsive to the operation of said lifting means raising the plow relative to the caster wheel into raised position for releasing said locking means to permit said wheel to caster, and yielding means actuated by movement of said lifting means when lowering said plow into operating position for yieldably holding said caster wheel locked in its non-castering position.

8. In a plow having a supporting caster wheel mounted for movement relative to the plow, lifting means movable from one position to another for raising the plow relative to said caster wheel into and out of operating position, and means responsive to the operation of said lifting means lowering the plow relative to the caster wheel into operating position for locking said wheel against castering and responsive to the operation of said lifting means raising the plow relative to the caster wheel into raised position for releasing said locking means to permit said wheel to caster, the combination with said lifting means of yielding means actuated by movement of said lifting means when lowering said plow into operating position for yieldably holding said caster wheel locked in its non-castering position.

9. In a plow having a supporting caster wheel mounted for movement, and a member connected therewith for moving said caster wheel, the combination of lifting means connected with said member for raising the plow relative to said caster wheel, means responsive to the operation of said lifting means lowering the plow relative to the caster wheel into operating position for locking said wheel against castering and responsive to the operation of said lifting means raising the plow relative to the caster wheel into raised position for releasing said locking means to permit said wheel to caster, and yielding means actuated by movement of said lifting means when lowering said plow into operating position for yieldably holding said caster wheel locked in its non-castering position.

CARL G. STRANDLUND.